(12) United States Patent
Kielwein et al.

(10) Patent No.: US 6,957,790 B2
(45) Date of Patent: Oct. 25, 2005

(54) SENSOR FOR A BELT RETRACTOR

(75) Inventors: Thomas Kielwein, Eschach (DE); Jürgen Rink, Waldstetten (DE); Bernd Semler, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 108 days.

(21) Appl. No.: 10/457,163

(22) Filed: Jun. 9, 2003

(65) Prior Publication Data

US 2003/0234310 A1 Dec. 25, 2003

(30) Foreign Application Priority Data

Jun. 21, 2002 (DE) .......................... 102 27 788

(51) Int. Cl.⁷ ............................................. B65H 75/48
(52) U.S. Cl. .................................................. 242/384.6
(58) Field of Search .............................. 242/384, 384.2, 242/384.4, 384.6; 280/806, 807; 297/478, 480

(56) References Cited

U.S. PATENT DOCUMENTS 6,435,442 B1    8/2002   Kielwein et al.

FOREIGN PATENT DOCUMENTS

| DE | 2534362 | 2/1977 |
|---|---|---|
| DE | 2713605 | 10/1978 |
| DE | 2731072 | 1/1979 |
| DE | 8304345 | 9/1983 |
| DE | 3410411 A1 | 10/1984 |
| DE | 9110281.2 | 11/1991 |
| DE | 298 22 610 U1 | 5/1999 |
| WO | WO82/02000 | 6/1982 |

*Primary Examiner*—William A. Rivera
(74) *Attorney, Agent, or Firm*—Tarolli, Sundheim, Covell & Tummino L.L.P.

(57) ABSTRACT

A sensor for triggering a vehicle occupant restraint system, in particular a locking mechanism of a belt retractor, comprises an inertia body, a lower shell in which the inertia body is received, and an upper shell which rests on the inertia body and into which it projects. The upper shell is part of a pivotally mounted sensor lever which swings on displacement of the inertia body and activates the locking mechanism. At least one of the shells has at least one projecting support section for abutment of the inertia body.

22 Claims, 8 Drawing Sheets

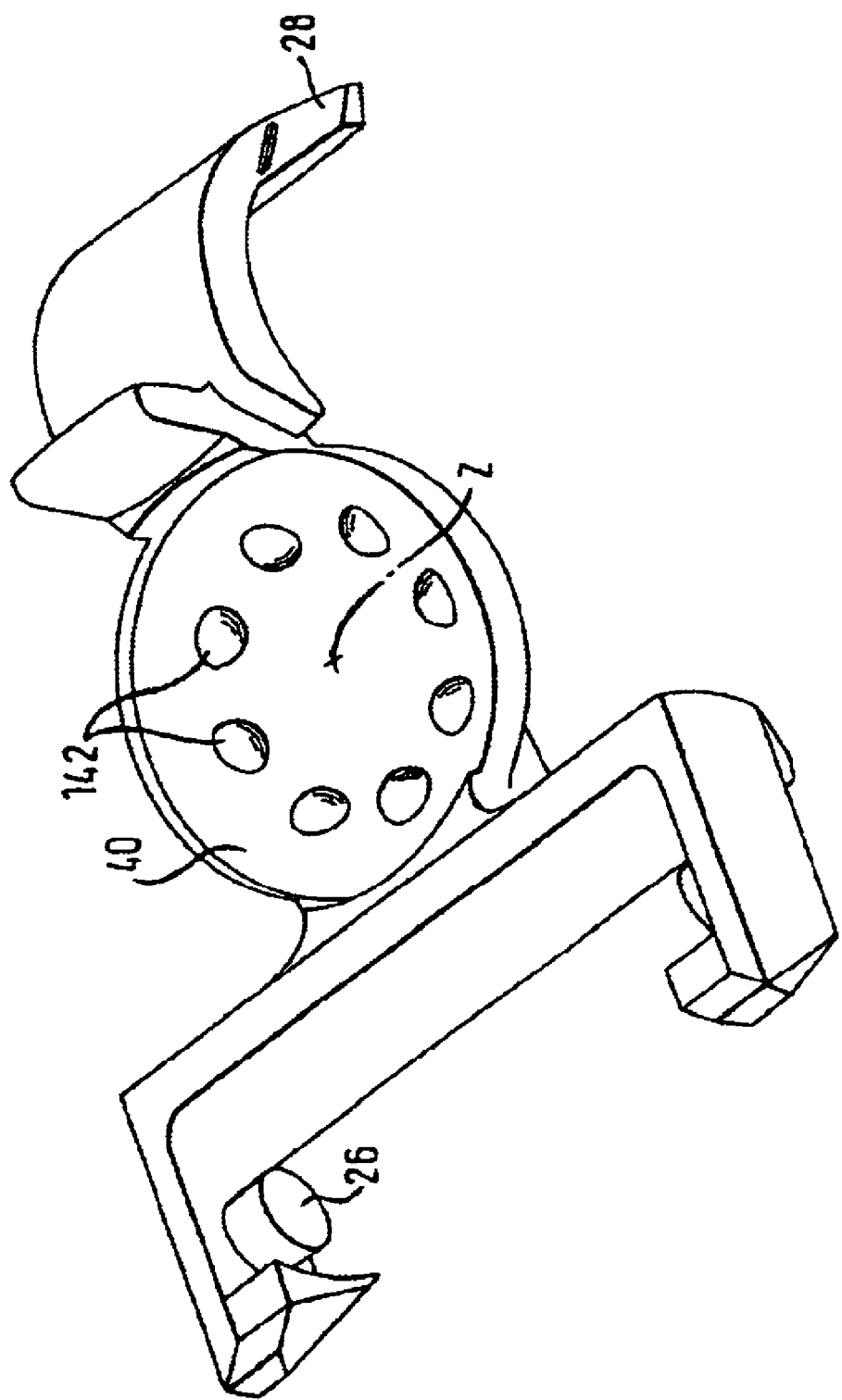

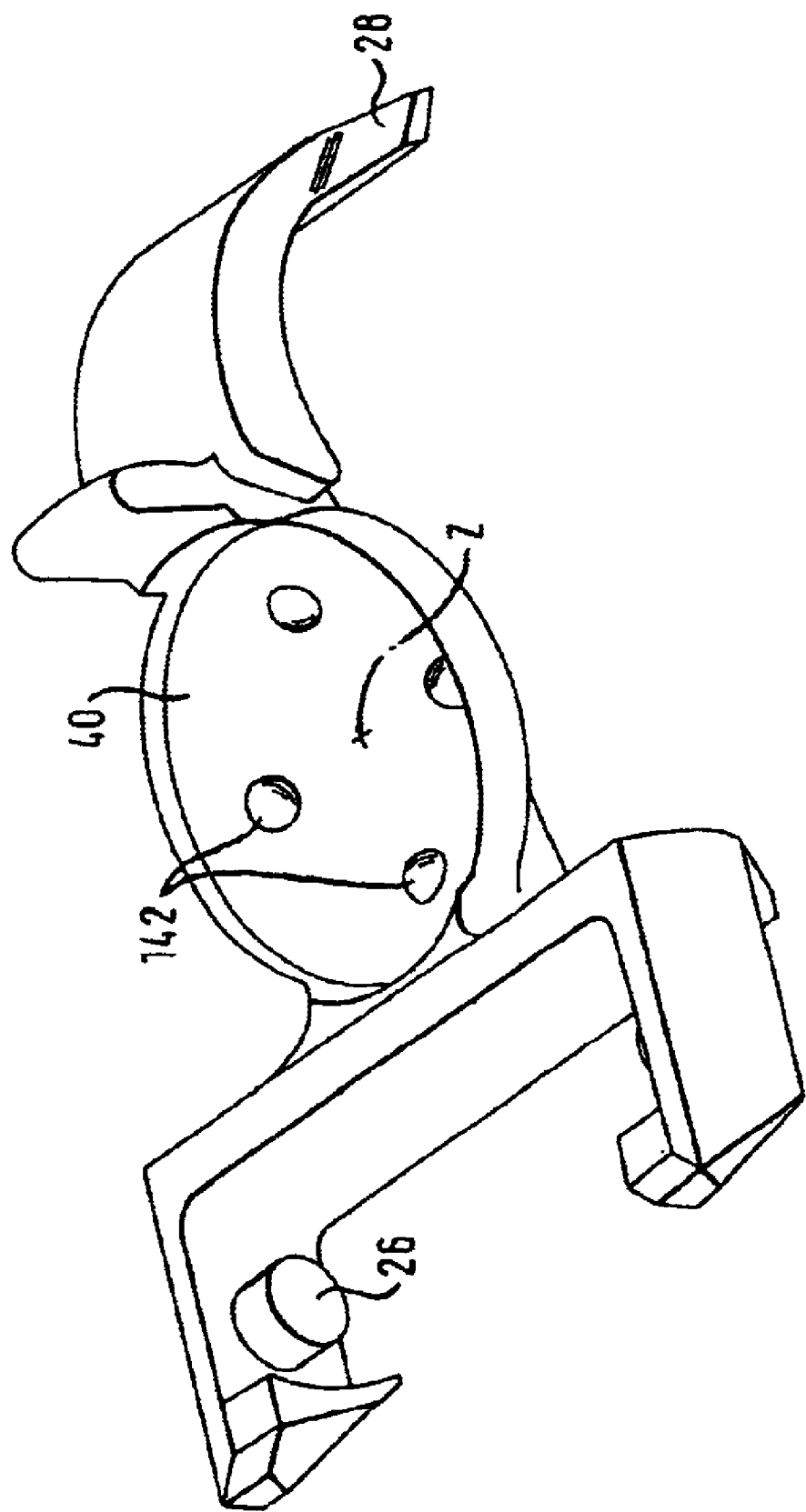

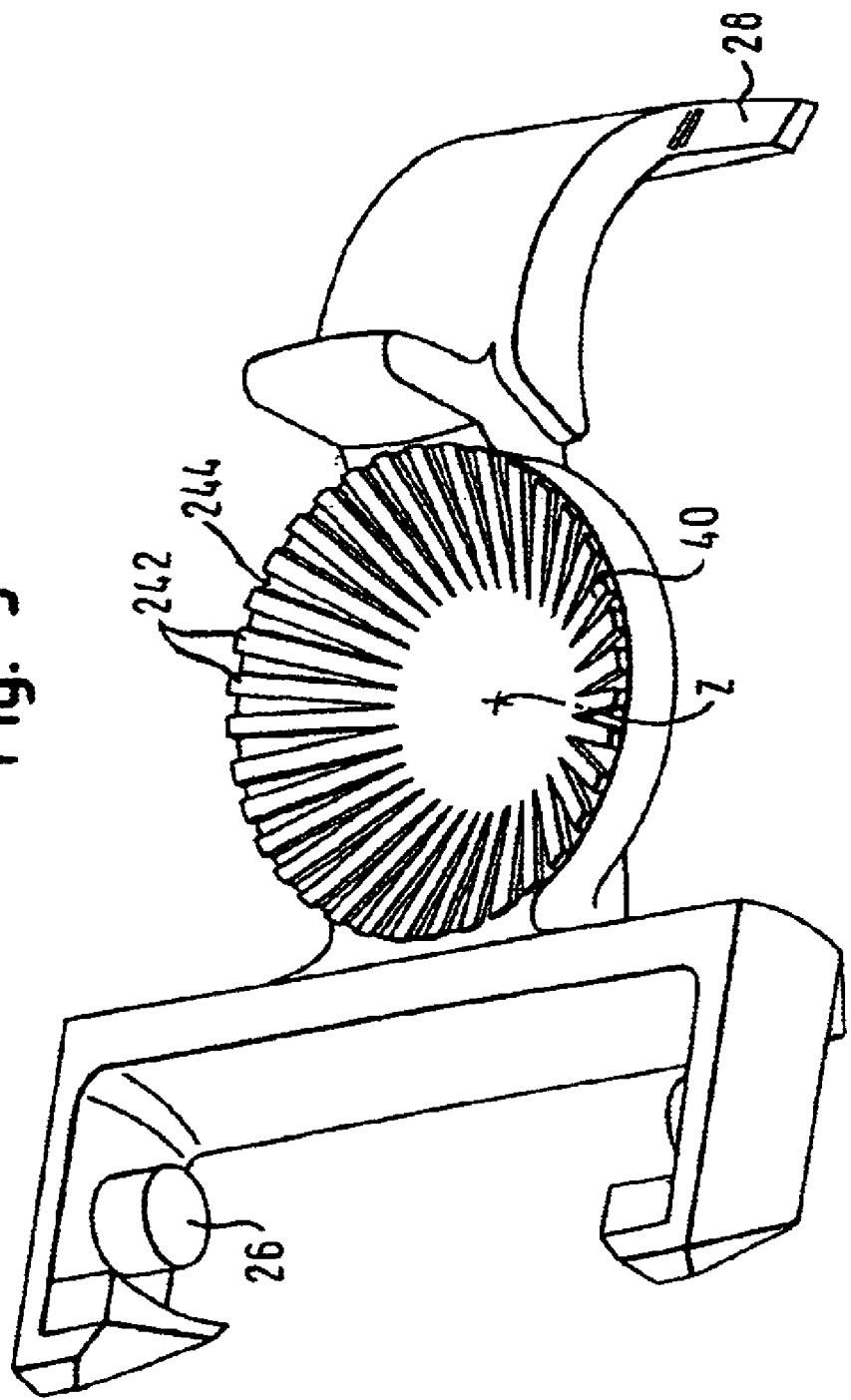

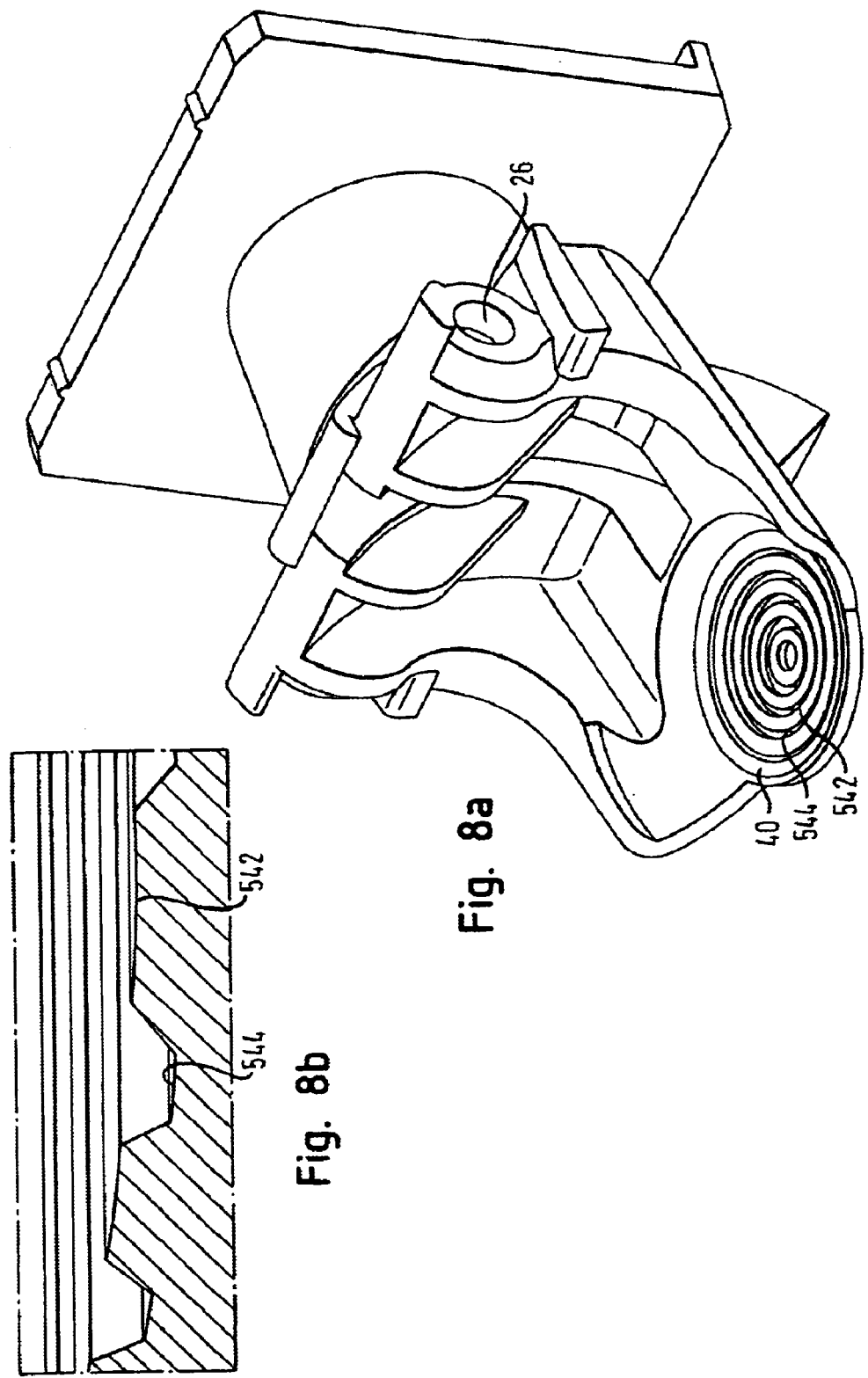

SENSOR FOR A BELT RETRACTOR

TECHNICAL FIELD

The invention relates to a sensor for triggering a vehicle occupant restraint system, in particular the locking mechanism of a belt retractor.

BACKGROUND OF THE INVENTION

Conventional sensors usually have an inertia body, a lower shell in which the inertia body is received, and an upper shell which lies on the inertia body and into which it projects, the upper shell being part of a pivotally mounted sensor lever which swings on displacement of the inertia body and activates the locking mechanism.

Such a vehicle-sensitive sensor is known for example from the DE 298 22 610 and is installed into vehicle safety belt retractors. In the case of an impact of the vehicle, the inertia body, preferably a steel ball, moves and leads to the swinging of the sensor lever. A coupling catch on the sensor lever is thereby guided into the coupling teeth of a blocking mechanism, which finally blocks the belt spool and prevents a withdrawal of belt band. The triggering of the sensor also takes place, however, at a particular inclined position of the vehicle.

BRIEF SUMMARY OF THE INVENTION

According to the invention, a sensor is provided in which the predetermined angle of tilt for triggering the sensor can be maintained within narrow limits. Furthermore, a smaller noise development is to occur, which is caused in that in operation, on contact of the control lever and the control disc on the belt retractor, rattling noises could occur. This reduction of the rattling noises must not lead to the smooth running and the problem-free locking engagement of the control lever being impaired.

These advantages are achieved in a sensor which comprises an inertia body, a lower shell in which the inertia body is received, and an upper shell which rests on the inertia body and into which it projects. The upper shell is part of a pivotally mounted sensor lever which swings on displacement of the inertia body and activates the locking mechanism. At least one of the shells has at least one projecting support section for abutment of the inertia body.

In prior art, the shells were either constructed as cups or as mountings in the shape of a truncated cone, i.e. as a support surface of revolution which is as smooth as possible. The invention differs from this by not in fact aiming for a continuously smooth, uniform surface, but rather providing projecting support sections. These may be formed, e.g. with respect to a cone-shaped side wall which defines the inner side of the shell, in that either the at least one support section projects (or, preferably, several support sections project) from this cone-shaped side wall, or that the support sections complement each other externally to the cone-shaped side wall and are only interrupted by grooves in the cone-shaped side wall. Between the grooves, a support section is then produced, projecting with respect to the base of the groove.

As has been found out in tests, through an interruption of the hitherto continuous support surface, a damping is achieved to reduce the noise formation and also a very precise triggering is achieved at the predetermined angle of tilt. Particularly when grooves are provided, a further effect also occurs. The dirt which is deposited in the course of time on the inertia body can be deposited in the pockets formed by the grooves. Also, the projecting support sections can lead to the dirt, which is deposited on the ball, being constantly stripped off.

Several punctual projections, e.g. in the form of spherical segments, can form the support sections, preferably at least three punctual projections being provided in the form of spherical segments, so that the inertia body in normal driving operation only rests on these projections.

In the preferred embodiment, the punctual projections in the form of spherical segments are arranged lying on a circle and spaced apart from each other circumferentially. This circle preferably has a center point which runs through the axis of symmetry of the inner side of the shell realized so as to be of revolution.

Another possibility for forming one or more support sections consists in forming one or more linear projections, for example by a ring-shaped projection, preferably in the form of a circular ring, being provided. Also, several concentric projecting rings can form the support sections.

Vice versa, of course also, as already mentioned, ring-shaped grooves can be formed in the shell, so that support sections projecting between the grooves are available for the abutment of the inertia body.

Another embodiment again makes provision to construct radial, substantially linear projections or grooves running along the shell. Therefore, a type of star-shaped pattern is produced on the shell, the rays of the star either being formed by grooves or by the projecting support sections.

The inertia sensor according to the invention is constructed such that in the basic position of the sensor lever, i.e. when the locking catch is not yet guided in, the inertia body rests exclusively on the projecting support sections.

BRIEF DESCRIPTION OF THE DRAWINGS

FIGS. 2 to 5 show perspective views of variously constructed sensor levers as part of the sensor according to the invention and FIGS. 6a to 8b show top views onto the sensor housing with the lower shell according to various embodiments and also detail views of the shell surface.

DETAILED DESCRIPTION OF THE PREFERRED EMBODIMENTS

Figure 1:
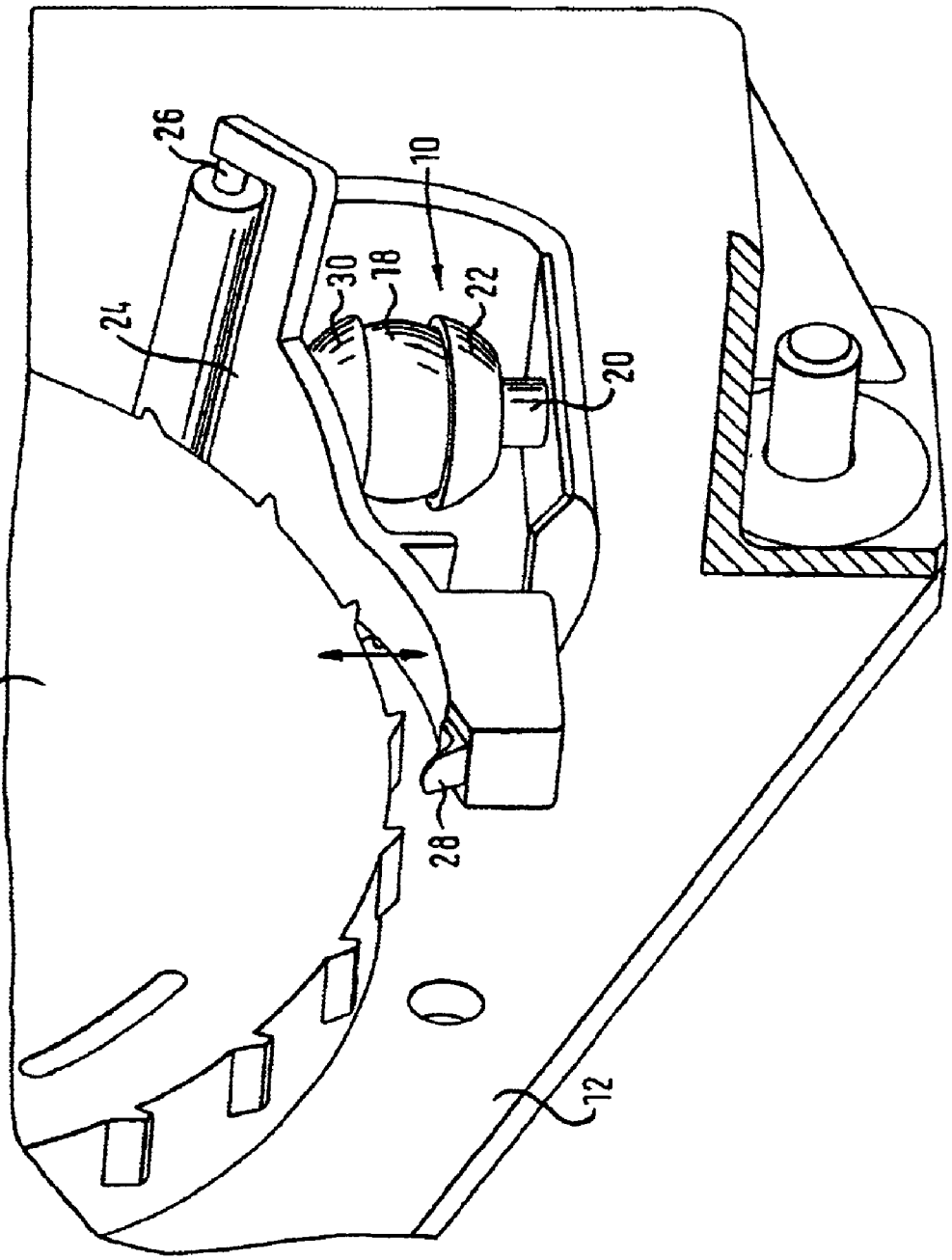
FIG. 1 shows a sectional view through a belt retractor with a sensor according to the invention.

In FIG. 1 a sensor 10 is shown for the vehicle-sensitive triggering of the locking mechanism of a safety belt retractor. Reference 12 designates the housing of the safety belt retractor, in which the sensor 10 is housed. 14 in turn designates the diagrammatically illustrated control disc with its teeth. The sensor consists substantially of three parts, namely an inertia body in the form of a ball 18, a sensor lower part, also known as sensor housing 20, which has a lower shell 22 to hold the ball 18, and of a sensor lever 24. The sensor lever 24 is constructed as a one-armed lever, which is pivotally connected with the sensor housing 20 by means of a swivel bearing 26. At the opposite end, a control catch 28 is formed onto the sensor lever 20, which control catch 28 can engage into the teeth 16 when the sensor lever 24 swings upwards. In addition, an upper shell 30 is formed onto the sensor lever 20, which upper shell 30 rests on the ball 18 and into which the ball 18 projects. The ball 18 is therefore secured between the lower and the upper shell 22 and 30, respectively.

With the alteration of the angle of the vehicle or decelerations of the vehicle, the ball 18 can move in the shells 22, 30 and in a known manner can lead to the deflection of the sensor lever 24 and for the engaging of the control catch 28 into the control disc 14 and hence to the triggering of the locking mechanism of the belt retractor.

When the word "shell" is used below, this therefore always means in the following the inner face of the shell-shaped mounting.

Various sensor levers are illustrated in FIGS. 2 to 5, which lead to the angle of tilt, at which the sensor responds, being exactly maintained and which avoid a development of noise, as previously mentioned.

Each of the shells 22, but also the shells 30, has a cone-shaped or cup-shaped side wall 40, the surface of which is uniformly smooth.

Figure 2:
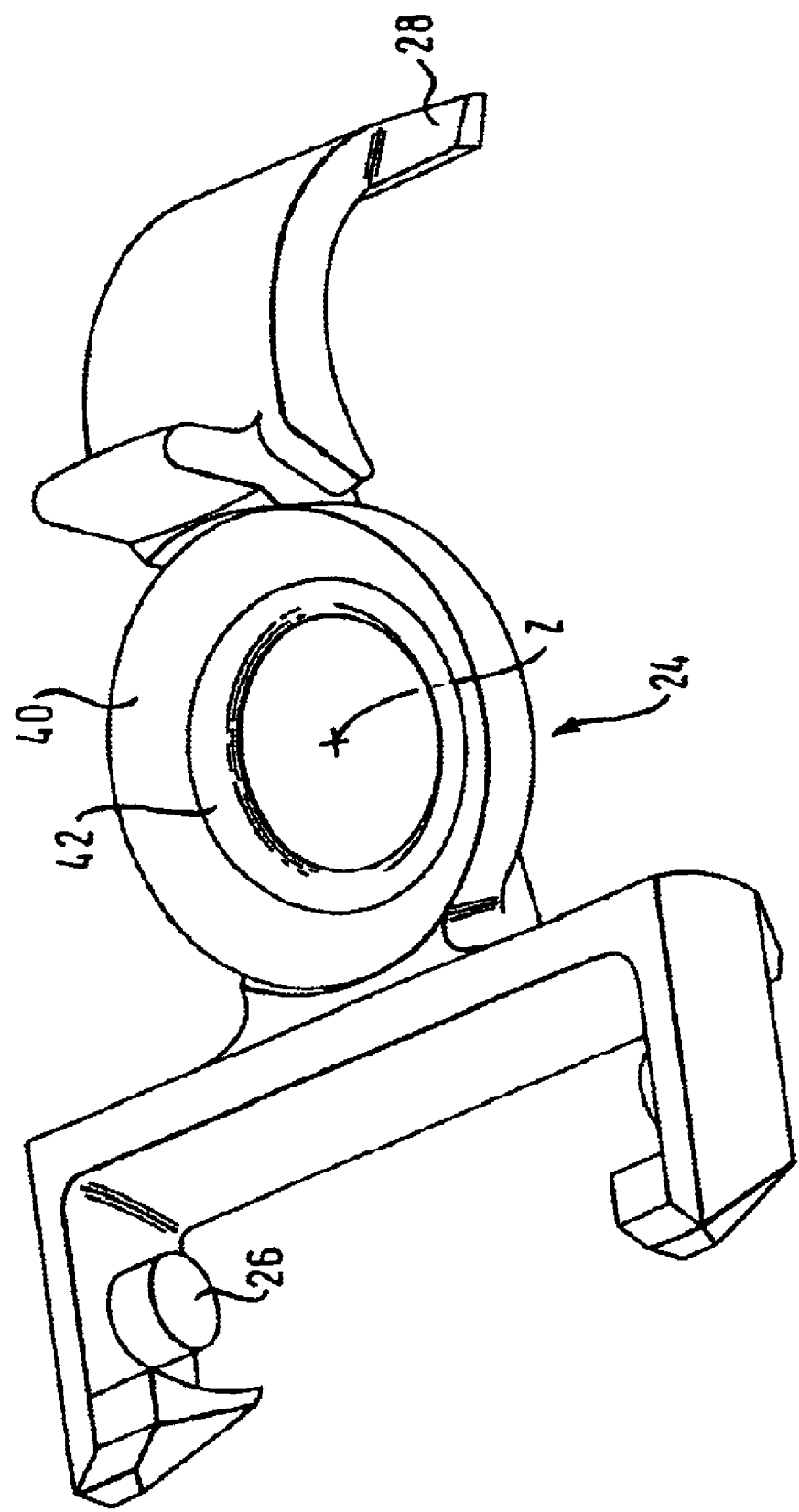

According to FIG. 2, a so-called support section 42 in the form of a ring, more precisely a circular ring, projects from the cone-shaped side wall 40. With this support section 42, projecting with respect to the side wall 40, the shell 22 and hence the sensor lever 24 rests on the ball 18.

The circular ring has a center Z which lies on the imaginary central axis of the side wall 40 of revolution.

In the embodiment according to FIG. 3, instead of the ring-shaped projecting support section, numerous punctual projecting support sections 142 are provided in the form of spheres or hemispheres which, however, are arranged on an imaginary circular ring, the center Z of which, as in FIG. 2, coincides with the imaginary central axis of the side wall 40.

Whereas in the embodiment according to FIG. 3, eight spherical or, more generally, punctual, projecting support sections 142 are provided, in the embodiment according to FIG. 4 only four punctual or spherical projecting support sections 142 are provided on the side wall 40. However, these again also lie on an imaginary circle around the center Z.

In the embodiment according to FIG. 5, the support surface for the ball 18 is composed of numerous star-shaped linear support sections 242, running radially outwards with respect to the center Z and along the side wall 40. These individual support sections 242 are formed in that between adjacent support sections 242 grooves or, more generally, depressions 244, are worked into the originally continuous cup- or cone-shaped side wall 40. The support sections 242 therefore project with respect to these grooves.

Owing to the support sections 42, 142 and 242, the ball can not deposit any dirt in the shell in the region of the contact lines or contact points.

In the embodiment according to FIG. 5, however, the ball can deposit the dirt in the depressions 244, which act as pockets.

The sensor according to the invention preferably also has on its lower shell 22 a surface shape which deviates from the hitherto usual cup shape or cone shape. This can be seen well in FIGS. 6a to 8b.

Figure 6A:
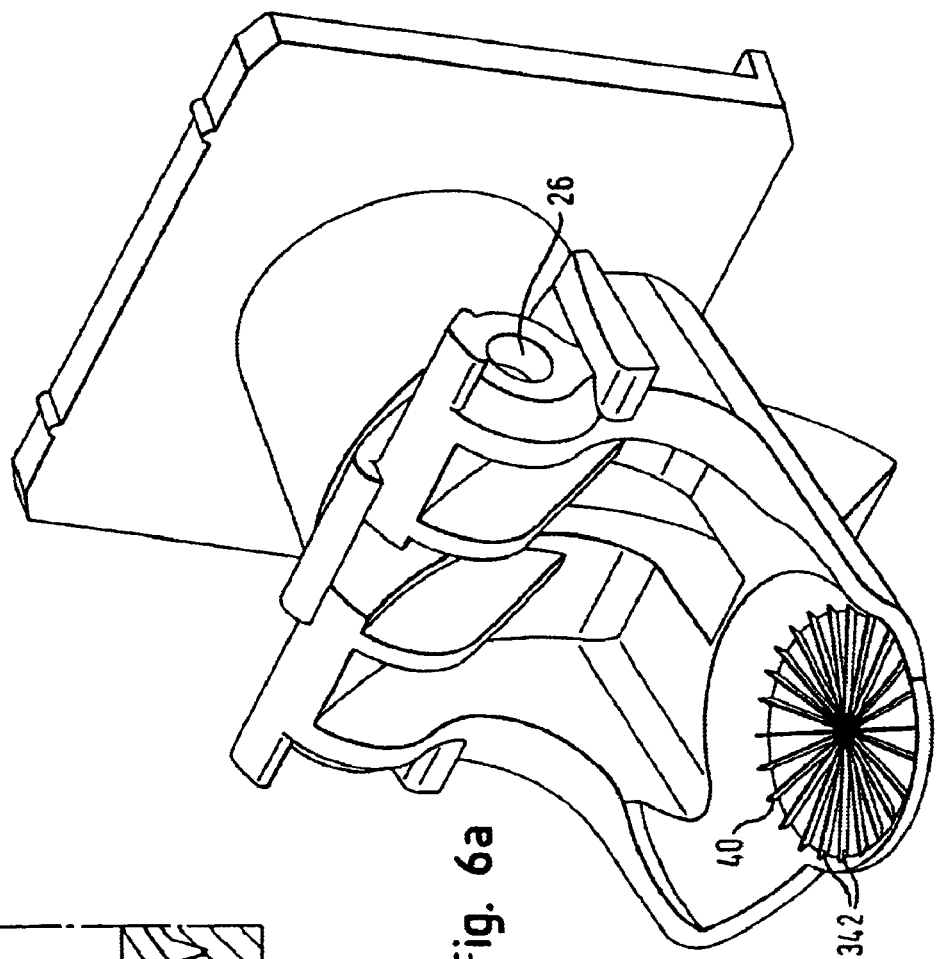
Figure 6B:
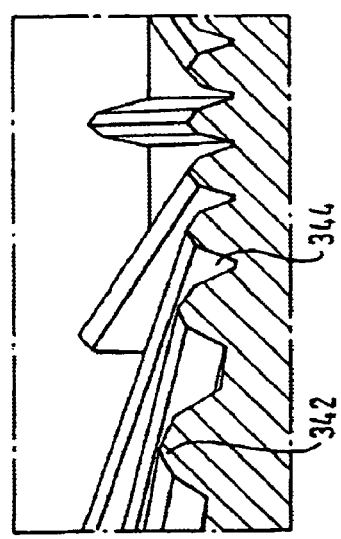

In the embodiment according to FIGS. 6a and 6b, as in the embodiment according to FIG. 5, linear support sections 342 are formed, which run outwards in a star shape and are formed in that groove-shaped depressions 344 are provided between adjacent support sections 342. The ball can deposit dirt in these depressions 344.

In the enlarged illustration of FIG. 6b it can be seen that the projection running out in the support section 342 is cone-shaped in cross-section and tapers upwards at an acute angle.

Figure 7A:
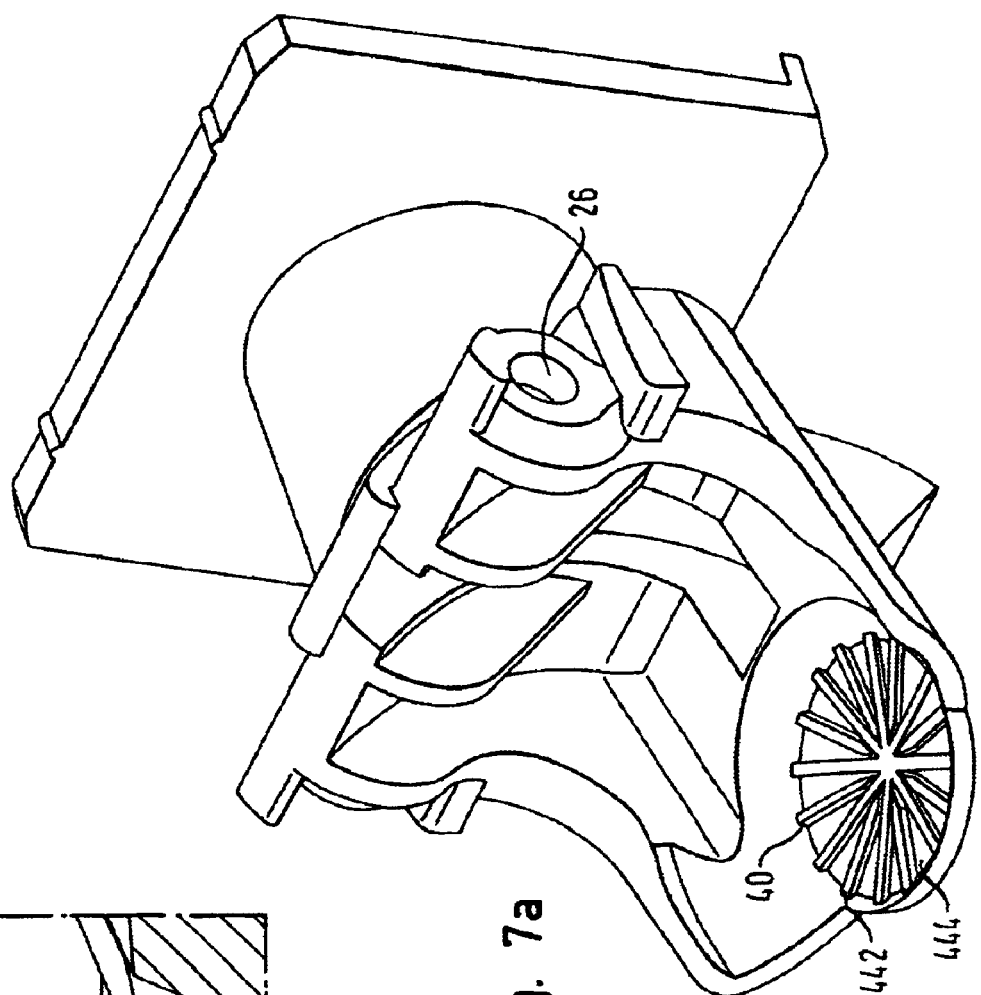
Figure 7B:
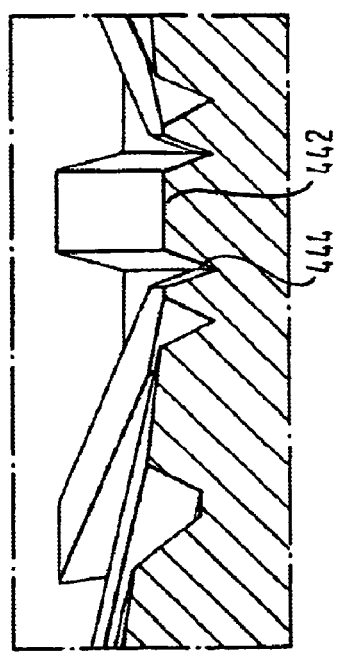

In the embodiment according to FIGS. 7a and 7b, the similarly constructed support sections 442 are formed by projections which are trapezoidal in cross-section, i.e. do not taper at an acute angle. Groove-shaped depressions 444 are provided between adjacent support sections 442.

In the embodiment according to FIGS. 8a and 8b, in a similar manner to that according to FIG. 2, support sections 542 are formed by numerous concentrically projecting rings, between which groove-shaped depressions 544 are provided for the depositing of dirt. Just like in the embodiments according to FIGS. 5 to 7b, also in this embodiment each support section 542 lies on a cup-shaped or, preferably, cone-shaped side wall 40, which is only interrupted by the depressions 544.

The ball 18 lies in its basic position, i.e. when the sensor lever 24 is not deflected for engagement into the teeth 16, in all embodiments exclusively on projecting support sections.

It is to be stressed that the various types of projection are only by way of example. Of course, other forms of projection are also possible, and also a combination of the possibilities of embodiment of the projection presented in the drawings.

Although it is in fact advantageous for the improvement of the angle of tilt and the noise reduction and also the deposit of dirt, if both the lower and also the upper shell 22, 30 are provided with the projecting support sections, it would of course also be possible to either only construct the lower or only the upper shell 22, 30 with such projecting support sections. The support sections only project a few tenths of a millimeter up to a few millimeters with respect to the side wall 40 or with respect to the base of the depressions.

It is to be noted that the depressions can be provided with through-holes or slits allowing the dirt to leave the corresponding shell.

What is claimed is:

1. A sensor for triggering a locking mechanism of a belt retractor, said sensor comprising
    an inertia body;
    a lower shell for receiving said inertia body; and
    an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body,
    said support section comprising at least one punctual projection forming a spherical segment.

2. The sensor according to claim 1, wherein a cone-shaped side wall is formed on said support section.

3. The sensor according to claim 2, wherein said support section projects from said cone-shaped side wall.

4. The sensor according to claim 2, wherein said support section forms said cone-shaped side wall, said cone-shaped side wall being interrupted by depressions in said support section.

5. The sensor according to claim 4, wherein said lower shell has depressions forming said support section.

6. The sensor according to claim 1, wherein said inertia body comprises a ball having a basic position resting exclusively on said support section.

7. A sensor for triggering a locking mechanism of a belt retractor, said sensor comprising
    an inertia body;
    a lower shell for receiving said inertia body; and
    an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising at least three punctual projections forming spherical segments.

8. A sensor for triggering a locking mechanism of a belt retractor, said sensor comprising an inertia body;

a lower shell for receiving said inertia body; and an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising spaced apart spherical segments arranged in a circle.

9. A sensor for triggering a locking mechanism of a belt retractor, said sensor comprising an inertia body;

a lower shell for receiving said inertia body; and an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising a projection in the shaped of a circular ring.

10. The sensor according to claim 9, wherein a cone-shaped side wall is formed on said support section.

11. The sensor according to claim 10, wherein said support section projects from said cone-shaped side wall.

12. The sensor according to claim 10, wherein said support section forms said cone-shaped side wall, said cone-shaped side wall being interrupted by depressions in said support section.

13. The sensor according to claim 12, wherein said lower shell has depressions forming said support section.

14. The sensor according to claim 9, wherein said inertia body comprises a ball having a basic position resting exclusively on said support section.

15. A sensor for triggering a locking mechanism of a belt retractor, said sensor comprising an inertia body;

a lower shell for receiving said inertia body; and an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising a plurality of projections forming concentric circular rings.

16. A sensor for triggering a locking mechanism of a belt retractor, said sensor comprising an inertia body;

a lower shell for receiving said inertia body; and an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising a plurality of projecting support sections formed by depressions between adjacent support sections.

17. The sensor according to claim 16, wherein a cone-shaped side wall is formed on said support section.

18. The sensor according to claim 17, wherein said support section projects from said cone-shaped side wall.

19. The sensor according to claim 17, wherein said support section forms said cone-shaped side wall, said cone-shaped side wall being interrupted by depressions in said support section.

20. The sensor according to claim 19, wherein said lower shell has depressions forming said support section.

21. The sensor according to claim 16, wherein said inertia body comprises a ball having a basic position resting exclusively on said support section.

22. A sensor for triggering a locking mechanism of a belt retractor, said sensor comprising an inertia body;

a lower shell for receiving said inertia body; and an upper shell resting on said inertia body, said inertia body projecting into said upper shell, said upper shell being part of a pivotally mounted sensor lever, said sensor lever swinging upon displacement of said inertia body thereby activating said locking mechanism, at least one of said shells having a projecting support section abutting said inertia body, said support section comprising a plurality of projecting support sections formed by grooves between adjacent support sections.

* * * * *